(12) United States Patent
Gan

(10) Patent No.: US 9,245,364 B2
(45) Date of Patent: Jan. 26, 2016

(54) PORTABLE DEVICE AND DISPLAY PROCESSING METHOD FOR ADJUSTMENT OF IMAGES

(71) Applicants: LENOVO (BEIJING) CO., LTD., Beijing (CN); BEIJING LENOVO SOFTWARE LTD., Beijing (CN)

(72) Inventor: Dayong Gan, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 66 days.

(21) Appl. No.: 13/741,926

(22) Filed: Jan. 15, 2013

(65) Prior Publication Data

US 2013/0182016 A1    Jul. 18, 2013

(30) Foreign Application Priority Data

Jan. 16, 2012 (CN) .......................... 2012 1 0012810

(51) Int. Cl.
| | |
|---|---|
| G06F 3/0488 | (2013.01) |
| G06T 11/60 | (2006.01) |
| G09G 5/00 | (2006.01) |
| G02B 27/01 | (2006.01) |

(52) U.S. Cl.
CPC .............. G06T 11/60 (2013.01); G02B 27/017 (2013.01); G02B 27/0176 (2013.01); G09G 5/00 (2013.01); G02B 2027/0127 (2013.01); G02B 2027/0187 (2013.01); G09G 2320/08 (2013.01); G09G 2340/045 (2013.01)

(58) Field of Classification Search
USPC ................................................. 345/619, 660
See application file for complete search history.

(56) References Cited

U.S. PATENT DOCUMENTS

| RE42,336 E * | 5/2011 | Fateh et al. ........................ 345/8 |
|---|---|---|
| 2009/0077501 A1* | 3/2009 | Partridge et al. .............. 715/846 |
| 2010/0091027 A1* | 4/2010 | Oyama et al. ................. 345/581 |
| 2010/0177053 A2* | 7/2010 | Yasutake ....................... 345/173 |
| 2010/0277420 A1* | 11/2010 | Charlier et al. ............... 345/173 |

(Continued)

FOREIGN PATENT DOCUMENTS

| CN | 101887343 | 11/2010 |
|---|---|---|
| WO | 2011106797 | 9/2011 |

OTHER PUBLICATIONS

Chinese Patent Application No. 201210012810.X, State Intellectual Property Office of People's Republic of China, First Office Action mailed on May 6, 2015; 10 pages.

(Continued)

*Primary Examiner* — Barry Drennan
*Assistant Examiner* — Terrell Robinson
(74) *Attorney, Agent, or Firm* — Dentons US LLP

(57) ABSTRACT

The present invention discloses a portable device and the display processing method thereof. The portable device comprises a first long side in the first dimension, a second short side in the second dimension, and a third side in the third dimension in the space, and the portable device comprises a first display unit in the plane formed by the first long side and the second short side. A first image is displayed on the first display unit. The display processing method comprises detecting the gesture operation of at least one side of the first long side, the second short side and the third side; generating an adjustment command according to the gesture operation; and adjusting the display effect of the first image according to the adjustment command.

8 Claims, 3 Drawing Sheets

300

(56) References Cited

U.S. PATENT DOCUMENTS

| | | | |
|---|---|---|---|
| 2010/0287470 A1* | 11/2010 | Homma et al. | 715/702 |
| 2010/0295781 A1* | 11/2010 | Alameh et al. | 345/158 |
| 2011/0221669 A1* | 9/2011 | Shams et al. | 345/156 |
| 2011/0221793 A1* | 9/2011 | King et al. | 345/690 |
| 2011/0227812 A1* | 9/2011 | Haddick et al. | 345/8 |

OTHER PUBLICATIONS

English Text Translation of First Office Action for Chinese Patent Application No. 201210012810.X, State Intellectual Property Office of People's Republic of China, First Office Action mailed on May 6, 2015; 11 pages.

English Translation of Chinese Patent Application No. 101887343 (A), published on Nov. 17, 2010, Sony Corp.; 28 pages.

Chinese Patent Application No. 201210012810.X, State Intellectual Property Office of People's Republic of China, Second Office Action mailed on Sep. 14, 2015; 9 pages.

English Text Translation of Second Office Action for Chinese Patent Application No. 201210012810.X, State Intellectual Property Office of People's Republic of China, Second Office Action mailed on Sep. 14, 2015; 12 pages.

* cited by examiner

PORTABLE DEVICE AND DISPLAY PROCESSING METHOD FOR ADJUSTMENT OF IMAGES

CROSS REFERENCE TO RELATED APPLICATIONS

This application is based upon and claims the benefit of priority from the prior Chinese Patent Applications CN 201210012810.X, filed in the State Intellectual Property Office of the P.R.C. on Jan. 16, 2012, the disclosure of which is hereby incorporated by reference in its entirety.

BACKGROUND

The present application relates to the field of the portable device and more particularly, to a portable device and the display processing method thereof.

In recent years, with the continuously increasing requirement on portability by the users, there appears a headset imaging device, i.e. so-called electronic glasses. Such a headset imaging device comprises a single or two separate display screens, and can display two images of the left-eye image and the right-eye image on the display screens, respectively. Thereby the two images are synthesized in the human brain and perceived as a stereoscopic image.

Because of the individual differences, such as the differences in interpupillary distance and vision of the users, when a different user is wearing such a portable device, the user is typically required to adjust the displayed image. In one prior method, an external adjustment device is provided with the portable device as a complete set. The external adjustment device is used to adjust the image displayed on the portable device. However, the size of this external adjustment device is relatively large. The external adjustment device, as an accessory independent of the portable device, reduces the portability of the portable device and brings inconvenience to the user.

In another prior method, the hard buttons, knobs, switches and the like are provided on the main body of the portable device, through which the image is adjusted. However, when the user is operating these hard buttons, knobs and switches, the worn position of the portable device will often be caused to offset or jitter, affecting the user's viewing the image and thus, affecting the adjustment effect.

SUMMARY

In view of the above, the present invention provides a portable device and the display processing method, so as to enable the user to conveniently adjust image displayed on the portable device at a relatively high accuracy, thereby improving the user's experience.

According to an embodiment of the present invention, a display processing method is provided, which is applied to a portable device. The portable device comprises a first long side in a first dimension, a second short side in a second dimension, and a third side in a third dimension in the space, and the portable device comprises a first display unit in the plane formed by the first long side and the second short side. A first image is displayed on the first display unit. The display processing method comprises detecting the gesture operation of at least one side of the first long side, the second short side, and the third side; generating an adjustment command according to the gesture operation; and adjusting the display effect of the first image according to the adjustment command.

The step of generating an adjustment command comprises determining the adjustment type according to the at least one side as the object of the gesture operation; determining the adjustment direction according to the operation direction of the gesture operation on the at least one side; and generating an adjustment command according to the adjustment type and the adjustment direction.

When a first gesture operation on the first long side is detected, the step of generating an adjustment command comprises determining the adjustment type to be the translational adjustment on dimension of the first long side; determining the adjustment direction to be positive direction or negative direction of the dimension of the first long side according to the direction of the first gesture operation; and generating a first adjustment command according to the adjustment type and the adjustment direction; and the step of adjusting the display effect of the first image comprises translating the first image on the dimension of the first long side based on the determined adjustment direction.

When the second gesture operation on the second short side is detected, the step of generating an adjustment command comprises determining the adjustment type to be the translational adjustment on dimension of the second short side; determining the adjustment direction to be positive direction or negative direction of the dimension of the second short side according to the direction of the second gesture operation; and generating a second adjustment command according to the adjustment type and the adjustment direction; and the step of adjusting the display effect of the first image comprises translating the first image on the dimension of the second short side based on the determined adjustment direction.

When the third gesture operation on the third side is detected, the step of generating an adjustment command comprises determining the adjustment type to be the zooming adjustment; determining the adjustment direction to be zooming in or zooming out according to the direction of the third gesture operation; and generating a third adjustment command according to the adjustment type and the adjustment direction; and the step of adjusting the display effect of the first image comprises zooming in or zooming out the first image based on the determined adjustment direction.

The portable device also comprises a second display unit in the plane formed by the first long side and the second short side and the second display unit displays a second image; and the step of adjusting the display effect of the first image comprises adjusting the display effect of at least one of the first image and the second image.

According to another embodiment of the present invention, a portable device is provided. The portable device comprising a first long side in a first dimension, a second short side in a second dimension, and a third side in a third dimension in the space, and the portable device comprising a first display unit in the plane formed by the first long side and the second short side, the first image being displayed on the first display unit, the portable device comprising a detection unit for detecting the gesture operation of at least one side of the first long side, the second short side and the third side; a generating unit for generating an adjustment command according to the gesture operation; and an adjustment unit for adjusting the display effect of the first image according to the adjustment command.

The generating unit comprising an adjustment type determining unit for determining the adjustment type according to at least one side as the object of the gesture operation; an adjustment direction determining unit for determining the adjustment direction according the direction of the gesture operation on at least one side; and an adjustment command generating unit for generating the adjustment command based on the adjustment type and the adjustment direction.

In the portable device and the display processing method of the embodiments of the present invention, by using the detecting unit, the user can adjust the image displayed on the portable device through smooth gesture operation. Compared with the technique to adjust by the key operations on hard keys, the stability of the portable device is enhanced during the adjustment process, thereby improving the adjustment accuracy and improving the user's experience.

In addition, in the portable device and the display processing method of the embodiment of the present invention, by associating the adjustment effect with the gesture operation conforming to the user's physiological habits, it is convenient for the user to learn and operate, further improving the user's experience.

DETAILED DESCRIPTION OF THE PREFERRED EMBODIMENTS

The embodiment of the present invention will be described with reference to the accompanying drawings.

Figure 1:
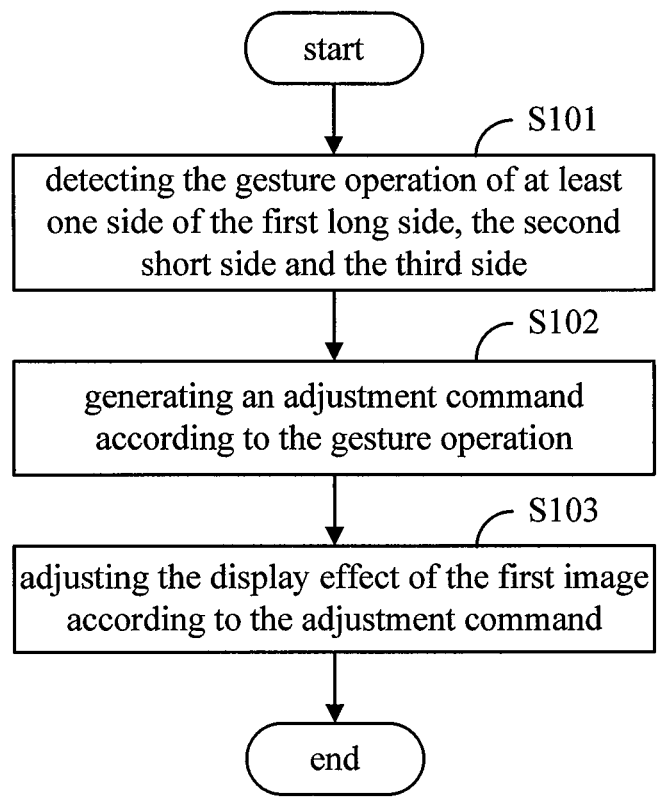
FIG. 1 is a flowchart illustrating the display processing method according to an embodiment of the present invention.

First, the display processing method according to an embodiment of the present invention will be described with reference to FIG. 1.

The display processing method according to an embodiment of the present invention is applied to a portable device. The portable device is, for example, a headset imaging device, i.e., so-called electronic glasses. Such a portable device comprises a first long side in a first dimension, a second short side in a second dimension, and a third side in a third dimension in the space. The first long side, for example, corresponds to the long side of the lens of the single-lens type electronic glasses or the long side of the two lenses (as a whole) of the two-lens type electronic glasses. The second short side, for example, corresponds to the short side of the lens of the electronic glasses, and the third side, for example, corresponds to the legs of the electronic glasses.

Further, the portable device comprises a first display unit in the plane formed by the first long side and the second short side, i.e., so-called lens. The first image can be displayed on the first display unit.

Further, touch sensors are provided on the first long side, the second short side, and the third side of the portable device, for sensing the user's gesture operation.

The variation of the display effect of the first image is associated with the dimension of the side where the gesture operation is performed.

Figure 3:
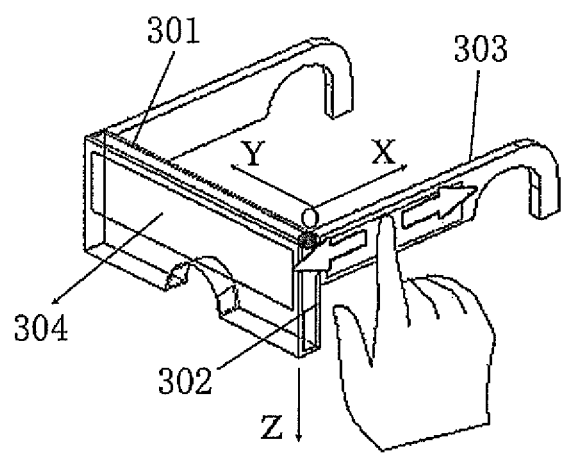
FIG. 3 is a diagram illustrating the portable device according to an embodiment of the present invention.

The diagram of the portable device, for example, is shown in FIG. 3. In the diagram of FIG. 3, the portable device 300 comprises a long side 301 in the Y-axis direction, a second short side 302 in the Z-axis direction, and a third side 303 in the X-axis direction. Each of the first long side 301, the second short side 302, and the third side 303 is provided with a touch sensor. In the plane formed by the first long side 301, the second short side 302, the first display unit 304 is included.

Hereinafter, the display processing method according to an embodiment of the present invention will be described.

First, at step S101, with the display processing method, the gesture operation, on at least one side of the first long side, the second short side, and the third side, is detected. Specifically, with the display processing method, the user's sliding gesture operation is detected by the touch sensors on the first long side, the second short side and the third side.

Next, at step S102, with the display processing method, according to the gesture operation, an adjustment command is generated.

Specifically, in one embodiment, with the display processing method, the adjustment type is firstly determined according to the said at least one side as the object of the gesture operation, such as, zooming adjustment, left and right translational adjustment, up and down translational adjustment.

Thereafter, with the display processing method, according to the operation direction of the gesture operation on the said at least one side, the adjustment direction is determined, such as, zooming in or zooming out, left translation or right translation, up translation or down translation and the like. Preferably, the determined adjustment direction is consistent with the gesture operation direction.

Then, with the display processing method, an adjustment command is generated based on the adjustment type and the adjustment direction determined as described above. The adjustment command includes the information about the adjustment type and the adjustment direction. In this embodiment, the display processing method also comprises the step of presetting the unit of adjustment amount, such as, the unit of zooming scale, the unit of pixel numbers for translation and the like, and the adjustment command includes information on the said unit of adjustment amount.

In another embodiment, with the display processing method, the adjustment amount may be further determined based on the sliding distance of the gesture operation. More specifically, for example, with the display processing method, the proportional relationship or the mapping relationship between the sliding distance and the adjustment amount may be preset, and the adjustment amount can be determined based on the sliding distance. The technology of determining adjustment amount based on the sliding distance is well known by those skilled in the art and the description thereof is thus omitted. Thereafter, with the display processing method, the adjustment command includes the information on the adjustment amount determined as described above.

Thereafter, at step S103, with the display processing method, the display effect of the first image is adjusted according to the adjustment command.

Hereinafter, the operations of step S102 and step S103 with respect to each side of the first long side, the second short side, and the third side will be described in detail.

More specifically, for example, with the display processing method, the gesture operation on the first long side is preset to correspond to the left-right translational adjustment, the gesture operation on the second short side is preset to correspond to the up-down translational adjustment, and the gesture operation on the third side is preset to correspond to the zooming adjustment.

In this case, when a first gesture operation (sliding operation) on the first long side is detected at step S101, with the display processing method, at step S102, the left-right translational adjustment is determined to be performed.

Further, at step S102, with the display processing method, according to the direction of the first gesture operation, the adjustment direction is determined to be left translation (translation towards left) or right translation (translation towards right). Assuming in the case of the portable device 300 shown in FIG. 3 the direction of the first gesture operation is positive Y-axis, i.e., the right-to-left direction, then the adjustment direction is determined to be left translation with the display processing method.

Thereafter, with the display processing method, a first adjustment commands is generated based on the adjustment direction and adjustment type, i.e. a left-right translation command of translating a unit amount in the Y-axis positive direction.

Thereafter, at step S103, with the display processing method, the first image is translated a unit amount on the dimension of the first long side (Y axis) in the direction (positive direction) of the first gesture operation.

In another embodiment, at step S102, with the display processing method, the distance of the first gesture operation is further determined, and the translation amount is determined based on the operation distance of the first gesture. Then, the information of the translation amount is included in the first adjustment command, thereby generating a left-right translation command of translating the translation amount in the Y-axis positive direction.

Thereafter, at step S103, with the display processing method, the first image is translated a distance corresponding to the distance of the first gesture operation, on the dimension of the first long side (Y axis) in the direction (positive direction) of the first gesture operation.

Similarly, when the second gesture operation (sliding operation) on the second short side is detected at step S101, with the display processing method, at step S102, an up-down translational adjustment is determined.

Further, at step S102, with the display processing method, the adjustment direction is determined to be up translation (translation towards up direction) or down translation (translation towards down direction) according to the second gesture operation direction. Assuming in the case of the portable device 300 shown in FIG. 3, the direction of the second gesture operation is negative Z-axis, i.e., the down-to-up direction, the adjustment direction is determined to be up translation with the display processing method.

Thereafter, with the display processing method, a second adjustment command is generated based on the adjustment direction and adjustment type, i.e. a up-down translation command of translating a unit amount in the Z-axis negative direction.

Thereafter, at step S103, with the display processing method, the first image is translated a unit amount on the dimension of the second short side (Z axis) in the direction (negative direction) of the second gesture operation.

In another embodiment, at step S102, with the display processing method, the distance of the second gesture operation is further determined, and the translation amount is determined based on the distance of the second gesture operation. Then, the information of the translation amount is included in the second adjustment command, thereby generating an up-down translation command of translating the translation amount in the Z-axis negative direction.

Thereafter, at step S103, with the display processing method, the first image is translated a distance corresponding to the distance of the second gesture operation, on the dimension of the second short side (Z axis) in the direction (negative direction) of the second gesture operation.

Similarly, when the third gesture operation (sliding operation) on the third side is detected at step S101, with the display processing method, at step S102, a zooming adjustment is determined.

Further, at step S102, with the display processing method, the adjustment direction is determined to be zooming out or zooming in according to the third gesture operation direction. Assuming in the case of the portable device 300 shown in FIG. 3, the direction of the third gesture operation is positive X-axis, i.e. the direction of pulling the image closer in accordance with the user's habit, the adjustment direction is determined to be zooming out with the display processing method.

Thereafter, with the display processing method, a third adjustment command is generated based on the adjustment direction and adjustment type, i.e. a zooming out command of zooming out a unit scale.

Thereafter, at step S103, with the display processing method, the first image is zoomed out a unit scale.

In another embodiment, at step S102, with the display processing method, the distance of the third gesture operation is further determined and the zooming scale is determined based on the operation distance of the third gesture. Then the information of the zooming scale is included in the third adjustment command, thereby generating a zooming out command for zooming out by the zooming out scale.

Thereafter, at step S103, with the display processing method, the first image is zoomed out by the zooming out scale corresponding to the distance of the third gesture operation.

It should be noted that, in the above described embodiments, examples are described, where the first display unit of the portable device only displays the first image. Then the portable device can be a two-dimensional display device. Alternatively, the first display unit of the portable unit can also display two images corresponding to the left-eye image and the right-eye image, so as to be integrated in the human brain and perceived as a three-dimensional image. In this case, the operations on the X-axis and Z-axis shown in FIG. 3 are similar to the embodiments described above and the description thereof is thus omitted.

On the Y-axis direction shown in FIG. 3, in one embodiment, with the display processing method, the origin O shown in FIG. 3 is used as the origin, and the left-right translation of both the left-eye image and the right-eye image is performed according to the direction of the first gesture.

Alternatively, in another embodiment, with the display processing method, the center of the first long side is used as the origin and translation is performed according to the direction of the first gesture operation to the origin. More specifically, when the direction of the first gesture operation is determined to get close to the origin with the display processing method, the left-eye image is translated to the right and the right-eye image is translated to the left with the display processing method, i.e. reducing the distance between the images of the two eyes. As described above, the translation amount can be a unit amount or can also be determined by the distance of the first gesture operation. On the other hand, when the direction of the first gesture operation is determined to get away from the origin with the display processing method, the left-eye image is translated to the left and the right-eye image is translated to the right with the display processing method, i.e. increasing the distance between the images of the two eyes. Thus, the corresponding adjustment is determined in the way that can conform to the user's physiological habit better, which improves the user's experience.

In addition, in the above described embodiments, examples are described, where the portable device comprises a complete block of display unit (the first display unit). Alternatively, the portable device may also comprise a first display unit and a second display unit respectively corresponding to the left eye and the right eye. That is, in addition to the first display unit described above, the portable device also comprises a second display unit in the plan formed by the first long side and the second short side, and the second display unit displays a second image. Further, with the display processing method, the display effect of at least one of the first image and the second image is adjusted. The specific operation method thereof is similar to the above description and is thus omitted.

Figure 4A:
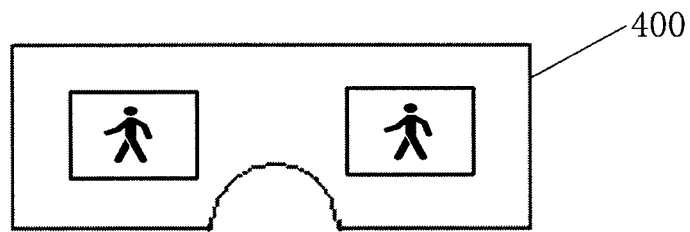
FIGS. 4A-4D are diagrams illustrating the display of the electronic device using the display processing method of the embodiment of the present invention.
Figure 4B:
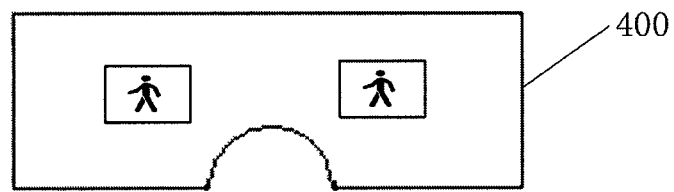
Figure 4C:
Figure 4D:
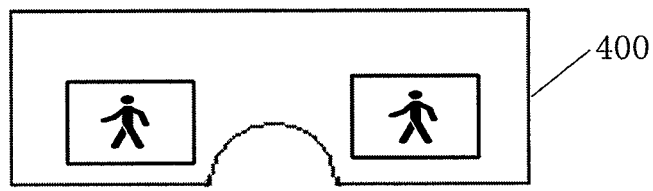

FIGS. 4A-4D illustrate diagrams 400 where the portable device shown in FIG. 3 uses the display processing method according to embodiments of the present invention. Specifically, FIG. 4A is a diagram of the display of the original first image and the original second image before the display processing method is performed. FIG. 4B is a diagram of the display after the user performs X-axis negative direction gesture operation on the third side of the portable device. FIG. 4C is a diagram of the display after the user performs a gesture operation to the first long side of the portable device to get away from the center of the first long side. FIG. 4D is a diagram of the display after the user performs the Z-axis positive gesture on the second short side of the portable device. After comparing FIGS. 4B-4D with FIG. 4A respectively, it can be seen that the first image and the second image shown in FIG. 4B are zoomed in, the distance between the first image and the second image shown in FIG. 4C gets larger and the positions of the first image, and the second image shown in FIG. 4D moves downwards. Thus, with the display processing method of the embodiments of the present invention, according to the user's gesture operation, the image displayed is adjusted with the adjustment effect conforming to the physiological habit of the user.

The display processing method according to the embodiments of the present invention is described above.

In the display processing method of the embodiments of the present invention, by detecting the user's gesture operation, it is possible for the user to adjust the image displayed on the portable device through relatively smooth gesture operations. Compared with the technique for adjustment by the key operations on the hard keys, the stability of the said portable device is enhanced during the adjustment process, thereby improving the adjustment accuracy and improving the user's experience.

In addition, in the display processing method of the embodiments of the present invention, by associating the adjustment effect with the gesture operation conforming to the physiological habit of the user, it is convenient for the user to learn and operate, further improving the user's experience.

Figure 2:
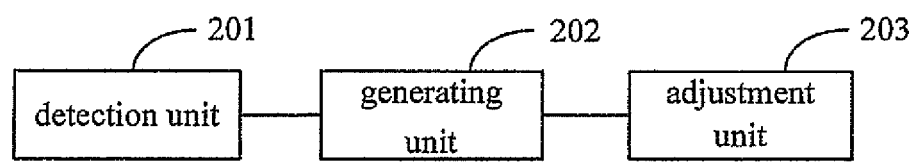
FIG. 2 is a block diagram illustrating the main configuration of the portable device according to an embodiment of the present invention.

The display processing method according to the embodiments of the present invention is described above. Hereinafter, a display processing device according to the embodiment of the present invention will be described with reference to FIG. 2. The display processing device can be embodied by the portable device 200 illustrated in FIG. 2.

The portable device comprises a first long side in the first dimension, a second short side in the second dimension, and a third side in the third dimension, and the portable device comprises a first display unit in the plane formed by the first long side and the second short side. The first image is displayed on the first display unit.

The portable device 200 comprises a detection unit 201, a generating unit 202 and an adjustment unit 203.

Specifically, the detection unit 201 detects the gesture operation on at least one side of the first long side, the second short side and the third side.

The generating unit 202 generates the adjustment command according to the gesture operation.

The adjustment unit 203 adjusts the display effect of the first image according to the adjustment command.

More specifically, the generating unit may include an adjustment type determining unit, an adjustment direction determining unit, and an adjustment command generating unit.

The adjustment type determining unit determines the adjustment type according to at least one side as the object of the gesture operation. The adjustment direction determining unit determines the adjustment direction according to the operation direction of the gesture operation on at least one side. The adjustment command generating unit generates the adjustment command based on the adjustment type and the adjustment direction.

In addition, the generation unit may further include an adjustment amount determining unit, which determines the adjustment amount according to the sliding distance of the gesture operation on at least one side. And the adjustment command generating unit generates the adjustment command based on the adjustment type, the adjustment direction, and the adjustment amount.

The operations performed by the portable device 200 with respect to the different sides detected by the detecting unit 201 have already been described in the display processing method of the embodiment of the present invention, and the description thereof is omitted.

The portable device according to the embodiments of the present invention is described above. In the portable device according to the embodiments of the present invention, by detecting the user's gesture operation, the user can adjust the image displayed on the portable device through a relatively smooth gesture operation. Compared with the technique for adjusting by the key operations on hard keys, the stability of the portable device is enhanced during the adjustment process, thereby improving the adjustment accuracy and improving the user's experience.

In addition, in the portable device of the embodiment of the present invention, through associating the adjustment effect with the gesture operation conforming to the user's physiological habits, it is convenient for the user to learn and operate, further improving the user's experience.

The portable device and the display processing method according to the embodiments of the present invention are described above with reference to FIG. 1 to FIG. 4

It should be noted that, in the description, the terms "comprise", "include" or any other variants are intended to cover non-exclusive scope, so that the process, method, article, or device comprising a series of elements not only includes those elements but also includes other elements not expressly listed, or includes inherent elements of the process, method, article, or equipment. In the case with no more restrictions, the elements defined by the statement "includes a . . . " does not preclude the existence of additional identical elements besides the said elements included by the process, method, article, or device.

Finally, it should also be noted that the above series of processes not only include the processes performed in time series in the order described herein, but also include the processes performed in parallel or separately instead of in time series.

Through the above description of the implementations, those skilled in the art can clearly understand that the present invention can be implemented by means of software and necessary general hardware platforms, or, of course, by hardware. Based on such understanding, the technical solution of the present invention as a whole or the part thereof that contributes to the prior art can be embodied in the form of a software product. The computer software product can be stored in storage media, such as ROM/RAM, magnetic disks, optical disks and the like, comprising instructions to make a device (may be a personal computer, sever, or network device and the like) implement the said method of each embodiment or some parts of the embodiments of the present invention.

In the embodiment of the present invention, the unit/module can be implemented by software, so as to be executed by various types of processors. For example, an identified executable code module may include one or more physical or logical blocks of computer instructions, which, for example, can be constructed as an object, procedure, or function. Nevertheless, the identified modules of executable codes do not need to be physically located together. Instead, they may include different instructions stored in different places. When these instructions are logically combined together, they constitute unit/module and achieve the specified purposes of the unit/module.

While the unit/module can be implemented using software, for all the units/modules that can be implemented by software considering the level of the prior hardware art, the corresponding hardware circuit can be built by those skilled in the art to achieve the corresponding function without considering the cost. The said hardware circuit includes the conventional ultra-large scale integrated (VLSI) circuit or the gate array and the prior semiconductor, such as the logic chip, the transistor and the like or other discrete components. The module may be implemented further by the programmable hardware device, such as a field programmable gate array, programmable array logic, programmable logic devices, etc.

The present invention is described in detail above. Specific examples are used herein to set forth the principles and the embodiments of the present invention. The descriptions of the above embodiments are only used to help the understanding of the method and the core idea of the present invention. Meanwhile, for those skilled in the art, according to the idea of the present invention, there may be some variations in the specific embodiment and the application scope. In summary, the content of the present description should not be understood as limitations of the present invention.

What is claimed is:

1. A display processing method applied to a portable device as an electronic glasses, the display processing method comprising:
   detecting, from a user, a gesture operation on one side of a first long side in a first dimension, a second short side in a second dimension, and a third side in a third dimension, in a space, comprised in the electronic glasses, and the portable device comprising a first display unit in a plane formed by the first long side and the second short side, a first image being displayed on the first display unit, the first long side being a long side of lens of the electronic glasses, the second short side being a short side of the lens of the electronic glasses, and the third short side being a leg of the electronic glasses;
   generating an adjustment command according to the gesture operation; and
   adjusting a display effect of the first image according to the adjustment command, wherein,
      the generation of the adjustment command includes determining an adjustment type according to the side as an object of the gesture operation, wherein an adjustment direction in which the adjustment is performed is consistent with a direction of the gesture operation so as to conform to a physiological habit of the user, and
      the gesture operation on the first long side corresponds to a left-right translational adjustment, the gesture operation on the second short side corresponds to an up-down translational adjustment, and the gesture operation on the third side corresponds to a zooming adjustment.

2. The method of claim 1, wherein the generation of the adjustment command further comprises:
   determining the adjustment direction according to the direction of the gesture operation on the side; and
   generating the adjustment command according to the adjustment type and the adjustment direction.

3. The method of claim 1, wherein, when a first gesture operation on the first long side is detected, the generation of the adjustment command comprises:
   determining the adjustment type to be a translational adjustment on a dimension of the first long side;
   determining an adjustment direction to be a first direction or a second direction which is opposite to the first direction of the dimension of the first long side according to a direction of the first gesture operation; and
   generating a first adjustment command according to the adjustment type and the adjustment direction; and
   adjusting the display effect of the first image comprises:
   translating the first image on the dimension of the first long side in the determined adjustment direction.

4. The method of claim 1, wherein when a second gesture operation on the second short side is detected, the generation of the adjustment command comprises:
   determining the adjustment type to be a translational adjustment on a dimension of the second short side;
   determining an adjustment direction to be a first direction or a second direction which is opposite to the first direction of the dimension of the second short side according to a direction of the second gesture operation; and
   generating a second adjustment command according to the adjustment type and the adjustment direction; and
   the adjustment of the display effect of the first image comprises:
      translating the first image on the dimension of the second short side in the determined adjustment direction.

5. The method of claim 1, wherein when a third gesture operation on the third side is detected, the generation of the adjustment command comprises:
   determining the adjustment type to be a zooming adjustment;
   determining an adjustment direction to be zooming in or zooming out; and
   generating a third adjustment command according to the adjustment type and the adjustment direction; and
   the adjustment of the display effect of the first image comprises:
      zooming in or zooming out the first image in the determined adjustment direction.

6. The method of claim 1, wherein:
   the portable device also comprises a second display unit in the plane formed by the first long side and the second short side and the second display unit displays a second image; and
   the adjustment of the display effect of the first image comprises:
      adjusting the display effect of at least one of the first image and the second image.

7. A portable device as an electronic glasses comprising:
a detection unit for detecting, from a user, a gesture operation on one side of a first long side in a first dimension, a second short side in a second dimension, and a third side in a third dimension, in a space, comprised in the electronic device, and the portable device comprising a first display unit in a plane formed by the first long side and the second short side, a first image being displayed on the first display unit, the first long side being a long side of lens of the electronic glasses, the second short side being a short side of the lens of the electronic glasses, and the third short side being a leg of the electronic glasses;
a generating unit for generating an adjustment command according to the gesture operation; and
an adjustment unit for adjusting a display effect of the first image according to the adjustment command,
wherein,
the generating unit comprises an adjustment type determining unit for determining an adjustment type according to the side as an object of the gesture operation, wherein an adjustment direction in which the adjustment is performed is consistent with a direction of the gesture operation so as to conform to a physiological habit of the user, and
the gesture operation on the first long side corresponds to a left-right translational adjustment, the gesture operation on the second short side corresponds to an up-down translational adjustment, and the gesture operation on the third side corresponds to a zooming adjustment.

8. The portable device according to claim 7, wherein the generating unit further comprises:
an adjustment direction determining unit for determining the adjustment direction according to an operation direction of the gesture operation on the side; and
an adjustment command generating unit for generating the adjustment command based on the adjustment type and the adjustment direction.

* * * * *